Patented July 18, 1939

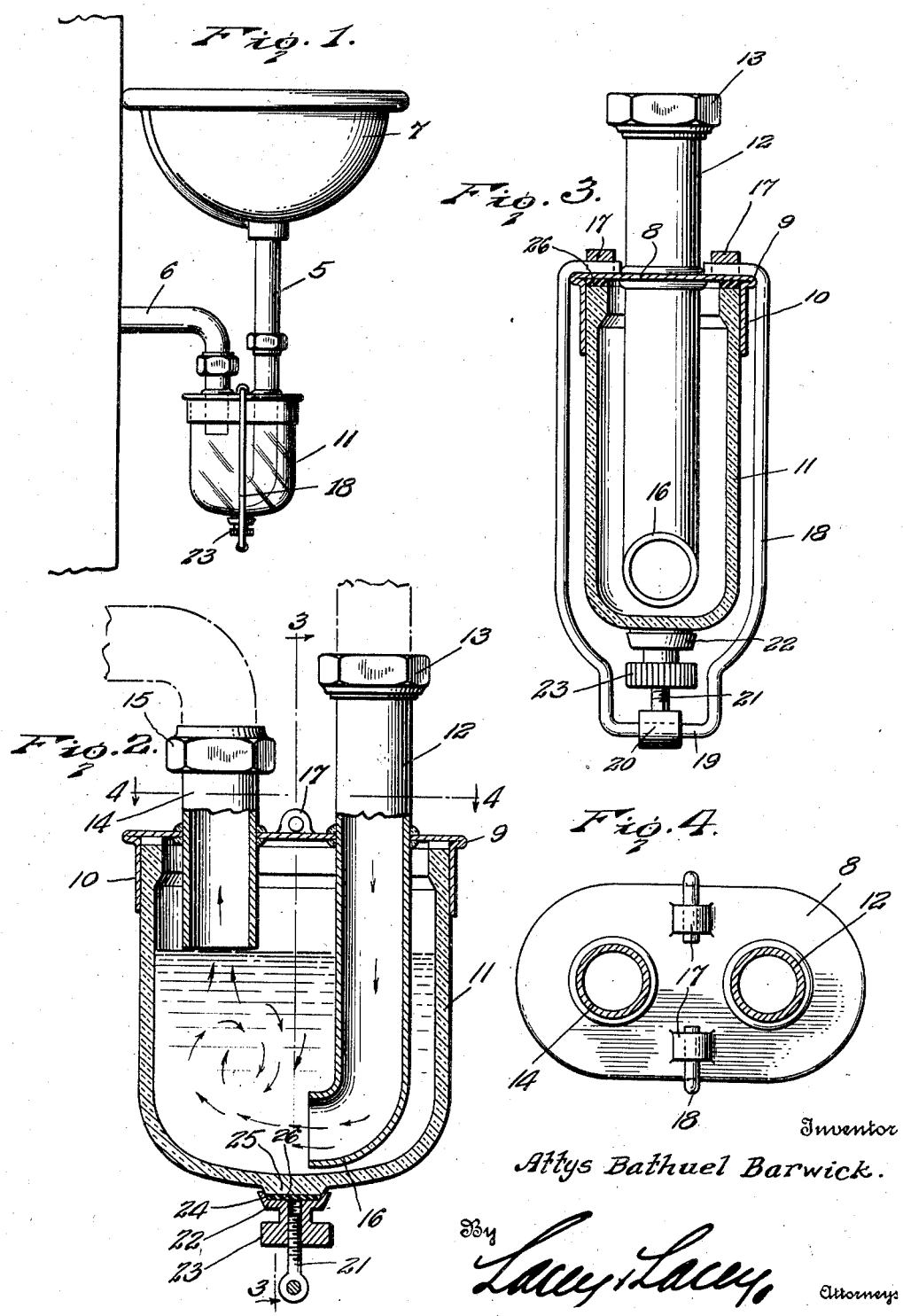

2,166,279

UNITED STATES PATENT OFFICE 2,166,279

VISIBLE SANITARY SINK TRAP

Attys Bathuel Barwick, Jacksonville, Fla., assignor of fifty-one per cent to Maxey D. Moody, Sr., Jacksonville, Fla.

Application April 17, 1937, Serial No. 137,579
Renewed January 23, 1939

5 Claims. (Cl. 182—19)

This invention relates to plumbing fixtures and more particularly to a visible sanitary sink trap.

The object of the invention is to provide a sanitary sink trap, the construction of which is such that the interior of the trap is visible at all times, thereby permitting inspection of the contents of the trap by the owner or caretaker of the property on which the trap is installed and the instant removal from the trap of any foreign objects which may have accidentally fallen therein without requiring the services of a plumber or other skilled mechanic.

A further object of the invention is to provide a sanitary sink trap including a crown cap or header and a transparent sediment container detachably connected therewith, said crown cap or header being provided with intake and discharge members projecting within the sediment container with their lower ends normally separated so that the liquid within the container will form a water seal and thus prevent escape of sewer gas and obnoxious fumes through the intake pipe and basin into the room or other enclosure where the trap is installed.

A further object is to provide the crown cap or header with a pivoted locking bail adapted to clamp beneath the sediment container for detachably supporting the container in position thereon whereby to permit said container to be conveniently removed from the header when it is desired to clean the same or remove any foreign objects therefrom.

A still further object of the invention is generally to improve this class of devices so as to increase their utility, durability and efficiency.

In the accompanying drawing forming a part of this specification and in which similar numerals of reference indicate corresponding parts in all the figures of the drawing:

Figure 1 is a perspective view of a sanitary sink trap embodying the present invention showing the same in position on a basin or bowl of standard construction, Figure 2 is an enlarged vertical sectional view, Figure 3 is a vertical transverse sectional view taken on the line 3—3 of Figure 2, and Figure 4 is a horizontal transverse sectional view taken on the line 4—4 of Figure 2.

The improved sanitary sink trap forming the subject-matter of the present invention may be installed in dwelling houses, office buildings and the like, and in Figure 1 of the drawing is shown connected with the drain pipe 5 and discharge pipe 6 of a bowl or basin 7 of standard construction.

The device comprises a crown cap or header 8 preferably formed of metal and substantially oval in shape, as shown, said header being provided with a circumferential reinforcing bead 9 and a depending flange 10 which detachably receives a sediment container, indicated at 11. The sediment container 11 is preferably formed of glass or other transparent material so as to permit the interior thereof to be visible at all times. Extending through the top of the crown cap or header and soldered or otherwise rigidly secured thereto is an intake pipe section 12 having its upper end provided with a swiveled coupling 13 for connection with the drain pipe 5 of the basin and its lower end extended downwardly within the sediment container 11 to a point adjacent the bottom thereof, as shown. Spaced from the intake pipe section 12 is a discharge pipe section 14 preferably shorter than the intake section and provided with a swiveled coupling 15 for detachable connection with the pipe 6 leading to the waste pipe. The lower end of the intake pipe section 12 is curved laterally, as indicated at 16, so as to impart a swirling motion to the liquid within the sediment container as said liquid is discharged into the container from the basin 7. As previously stated, the discharge pipe section 14 is relatively short and spaced from the curved end 16 of the intake pipe section 12 so that, when the liquid fills or nearly fills said sediment container, a syphonic action will be established and said liquid will flow out through the discharge pipe 14 to the waste pipe, as will be readily understood. When, however, the level of the liquid in the sediment container is flush with or slightly below the lower end of the discharge pipe, this syphonic action will be broken and the liquid within the sediment container will form a water seal so as to prevent the escape of sewer gas and obnoxious fumes through the pipe 12 and basin into the interior of the room in which the trap is installed. The top of the crown cap or header 8 is provided with spaced perforated ears 17 in which is pivotally mounted the adjacent arms of a substantially U-shaped clamping bail 18. The lower or free end of the clamping bail is provided with a straight portion 19 on which is pivotally mounted, at 20, an adjusting screw 21. Engaging the threads of the screw 21 is a cap 22 having a knurled portion 23 to facilitate rotating the same and provided at its upper end with a seat adapted to receive a yieldable gasket 24 which latter bears against a projection or thickened portion 25 formed integral with the bottom of the sediment container, as shown. The side arms of the bail 18 bear against the reinforcing rib 9 and serve to space said arms from the glass sediment container so as to prevent injury thereto when said bail is moved to operative and inoperative position. A gasket 26 is preferably interposed between the header 8 and the upper end of the sediment container so as to prevent leakage of the liquid within the container when the parts are assembled.

It will thus be seen that the interior of the sediment container is always visible so that should a ring or other piece of jewelry be accidentally deposited in said container through the pipe 5 of the basin or should any other foreign objects find their way into the sediment container, said foreign objects will be readily visible through the walls of the sediment container. Moreover, the visibility of the sediment container will allow instant inspection thereof so that the trap may be kept in a clean sanitary condition at all times.

When it is desired to obtain access to the interior of the sediment container for the purpose of removing any foreign particles therefrom or for cleaning the same, it is merely necessary to rotate the cap 22 until said cap clears the projection 25 and then swing the locking bail 18 upwardly when, by exerting a slight downward pull on the sediment container, the latter may be readily removed from the crown cap or header. In reassembling the parts the upper or open end of the sediment container is first inserted within the flange 10 of the header, after which the locking bail is swung downwardly until the cap 22 is opposite the projection on the bottom of said container when by rotating the knurled portion 23 of the cap the latter will be forced against the bottom of the container and the upper end of the container against the gasket 26 so as to securely hold the sediment container in position on the crown cap and effectually prevent leakage.

It will thus be seen that there is provided a sanitary sink trap, the construction of which is such that the interior of the trap is visible at all times thereby permitting inspection of the contents of the trap by the owner or caretaker of the property on which the trap is installed and which will also permit instant removal of any foreign matter from the trap without requiring the services of a plumber or other skilled mechanic.

It will, of course, be understood that the traps may be made in different sizes and shapes and constructed from any suitable material without departing from the spirit of the invention.

Having thus described the invention, what is claimed as new is:

1. A sanitary sink trap comprising a header, a transparent sediment container detachably engaging the header, intake and discharge pipes carried by the header and projecting within the sediment container, the projecting end of the intake pipe being imperforate and having its lower end curved laterally and terminating approximately at the center of the bottom of the sediment container, and a locking bail pivotally mounted on the header and detachably engaging the bottom of the sediment container.

2. A sanitary sink trap comprising a header having a circumferential reinforcing bead and a depending flange, a detachable transparent sediment container fitting within the flange of the header, a gasket interposed between the header and the adjacent end of the sediment container, intake and discharge pipes extending through the header and projecting within the sediment container with their lower ends normally spaced apart, the lower end of the intake pipe being imperforate and curved laterally and terminating approximately at the medial longitudinal axis of said sediment container, a substantially U-shaped locking bail pivotally mounted on the header and including side arms bearing against the reinforcing bead, and an adjustable cap carried by the locking bail and adapted to engage the sediment container for clamping said container against the gasket.

3. A sanitary sink trap comprising a header having a circumferential reinforcing bead and a depending flange, a transparent sediment container detachably fitting within the flange of the header, intake and discharge pipes extending through the top of the header, the upper ends of said pipes being provided with couplings for engagement with the drain pipe and waste pipe respectively of a basin, the lower end of the intake pipe being imperforate and extended to a point near the bottom of the container and having its terminal curved laterally and terminating approximately at the medial longitudinal axis of said sediment container, a substantially U-shaped locking bail pivotally mounted on the header, and an adjustable cap carried by the locking bail and adapted to bear against the bottom of the sediment container.

4. A sanitary sink trap comprising a header having a circumferential reinforcing bead and a depending flange, a gasket fitting within the header, a transparent sediment container extending within the flange and bearing against the gasket, intake and discharge pipes extending through the top of the header and having their upper ends provided with coupling members and their lower ends imperforate and projected within the sediment container, the lower end of the intake pipe being curved laterally and terminating approximately at the medial longitudinal axis of said sediment container, perforated ears on the top of the header, a substantially U-shaped locking bail pivotally mounted in said perforated ears and including side walls bearing against the reinforcing bead, the free end of said locking bail being provided with a flat portion, a threaded member pivotally mounted on said flat portion, and a cap engaging said threaded member and adapted to bear against the bottom of the sediment container.

5. A sanitary sink trap comprising a header having a flat top provided with a circumferential reinforcing bead and a depending flange, a transparent sediment container fitting within the flange and having its bottom portion provided with a projection, intake and discharge pipes extending through the top of the header and having their upper ends provided with coupling members and their lower ends projecting within the sediment container, the lower end of the intake pipe being curved laterally and terminating at approximately the medial vertical axis of the sediment container, a gasket interposed between the upper end of the sediment container and said header, spaced ears secured to the top of the header between said pipes, a substantially U-shaped locking bail pivotally mounted in said perforated ears and including side portions bearing against the reinforcing bead, a threaded member pivotally mounted on the free end of the locking bail, a cap engaging said threaded member and provided with a terminal seat, and a gasket fitted in said seat and adapted to bear against the projection on the sediment container.

ATTYS BATHUEL BARWICK.